March 24, 1936. C. G. CURTIS 2,035,222
POPPET VALVE GEAR FOR INTERNAL COMBUSTION OR OTHER ENGINES
Filed Jan. 9, 1936
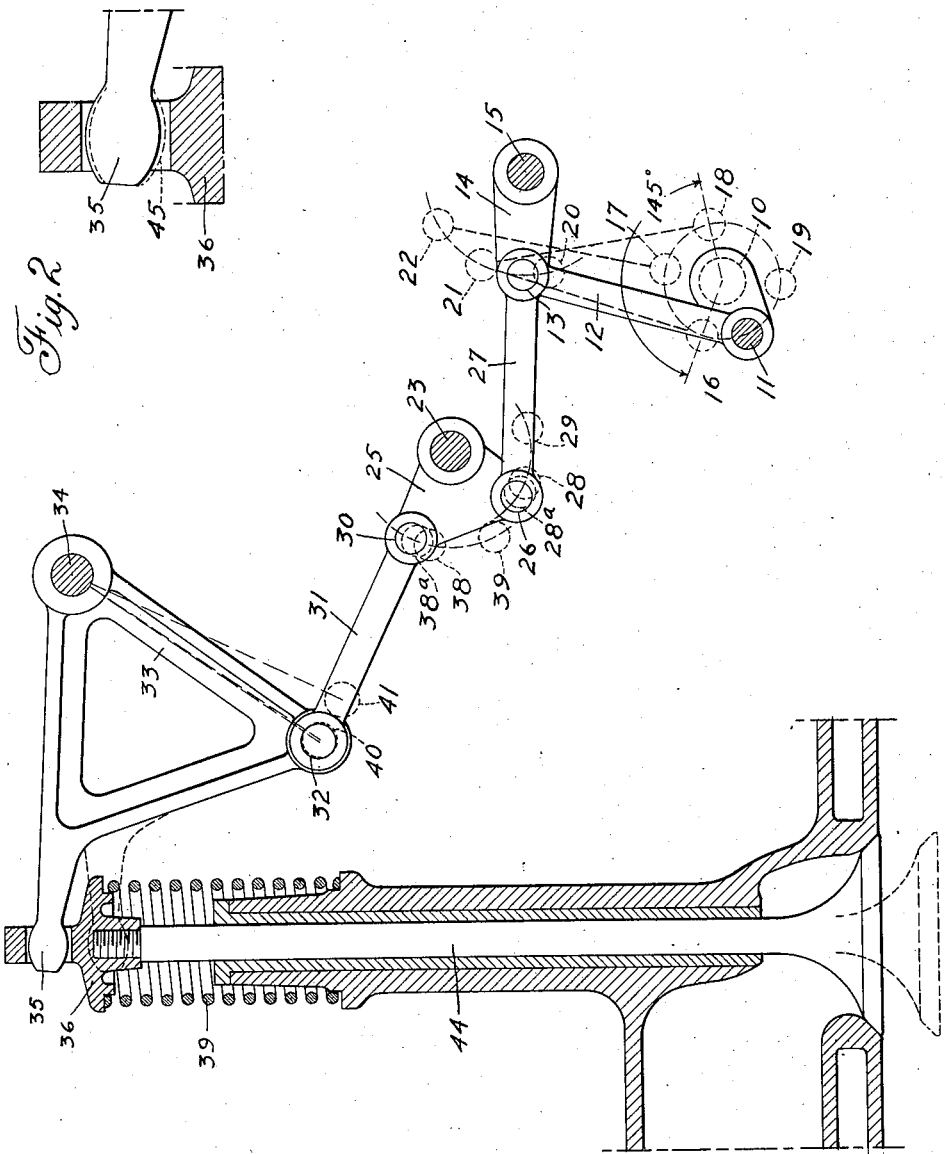

Patented Mar. 24, 1936

2,035,222

UNITED STATES PATENT OFFICE 2,035,222

POPPET VALVE GEAR FOR INTERNAL COMBUSTION OR OTHER ENGINES

Charles G. Curtis, New York, N. Y.

Application January 9, 1936, Serial No. 58,354

10 Claims. (Cl. 123—90)

The main object of this invention is to provide mechanism for opening and closing poppet valves of internal combustion or other engines which will eliminate the necessity for any cam action or of using powerful springs for closing such valves. By my improved mechanical arrangement I am able to open and close poppet valves of considerable size and weight at much higher speeds than heretofore, to bring such valves to their seats gently, and to accomplish this result with a very simple, strong and reliable kind of mechanism operated by means of a crankshaft transmitting its motion to the valves through mechanism such as simple connecting rods, bell cranks or rocking arms. The closing of the valve may also be effected by the same mechanism which operates to open it, thereby eliminating the powerful springs which are used to close such valves when they are opened by cam action.

An embodiment of the invention is illustrated in the accompanying drawing, wherein:

Fig. 1 is a view partly in side elevation and partly in section of said embodiment; and Fig. 2 is a view in section of a detail.

In the drawing, numeral 10 represents a crankshaft of small throw, the crankpin 11 of which is connected by a connecting rod 12 with the crankpin 13 formed on a rocking arm 14 which rocks on a pivot 15.

Let us assume the case of a two-cycle engine and that it is desired to have the poppet exhaust valves begin to open at the point 16 in its revolution, be completely open at point 17 and close again at point 18; that is, they remain open through an arc of about 145°. When the crankpin 11 is at the bottom of the stroke as shown at point 19, the crankpin 13 swinging around the pivot 15 will occupy the position 20 on the arc of movement. When the crankpin 11 on its upper movement reaches the position shown, the crank arm 14 will occupy the position shown. When the crankpin 11 reaches point 16 the crankpin 13 will reach point 21, and when crankpin 11 reaches point 17 the crankpin 13 will be at point 22. Similarly on the downward movement when the crankpin 11 reaches point 18 the crankpin 13 will come back to the point 21 closing the valve again. In passing from point 18 to point 19 the crankpin 13 will swing down from point 21 to point 20. It will be noted that in swinging from the position shown to either the position 21 or 20 the movement of the crankpin 13 traverses a horizontal movement which is very small compared with that represented by the movement from point 21 to point 22. In order to further diminish the former movement compared with the latter, I provide a second rocking arm or bell crank 25 swinging around the pivot 23 and I connect the crankpin 26 with the crankpin 13 by a connecting rod 27. With this arrangement when the crankpin 13 reaches the point 21 the crankpin 26 is pulled to the position 28, and when the crankpin 13 reaches the position 22 the crankpin 26 is pulled to position 29. In this way I am able to cause the movement from the point 16 to point 17 on the crankshaft which causes the opening of the valve to bring about a considerable horizontal movement from point 28 to point 29 and yet produce a very small movement from position 26 to position 28, resulting from the movement of crankpin 11 from point 18 to point 19. The considerable horizontal movement thus obtained from point 28 to point 29 may be made sufficient to open the valve by direct action, and yet after the crankpin has returned from point 29 to point 28, the valve will be brought near to its seat more or less gently and can then be held to its seat by a spring or by the gas pressure in the cylinder, the valve mechanism surrendering the valve to the spring at this instant, by a suitable arrangement, as the means hereinafter described, so as to permit the valve to seat itself properly and to remain seated by the action of the spring.

In order to intensify this effect however, I provide a second crankpin 30 formed on the rocking arm or bell crank 25 and I connect this by a rod 31 with a crank-pin 32 formed on a triangle or bell crank 33 which swings around a pivot 34. To move the valve both to and from its closing position by the operating mechanism and to provide the clearance of lost motion just referred to, the end of the bell crank 33 may be formed into an arm 35 with slightly rounded top and bottom faces as shown, which engages with the top and bottom surfaces formed in the valve stem head which is attached to valve stem 44 but with a small clearance so as to permit the arm 35 to play up and down a small amount without engaging with the walls of the part 36. 39 is a spring which need not be of any great strength for holding the valve on the seat after the arm 35 has become disengaged from the part 36. The crank-pin 30 is set at such an angle with reference to the crankpin 26 that when the crank 26 is in the position shown the crank pin 30 is nearly on the dead center, that is, it is nearly on the line connecting the pin 32 with the pivot 23 of the bell crank 25. When the crank-pin 26 is pulled to the position 28 the crankpin 30 moves to position 38, and when the crankpin 26 is pulled to position 29 crankpin 30 moves to position 39. The crankpin 30 when moving from the position shown to position 38 pulls crank-pin 32 from the position shown to position 40 very slightly to the right, too slight to be shown clearly in the drawing, and when the crankpin 30 moves to position 39 it pulls crankpin 32 to position 41. It will be observed that in this way I am able to cause the movement of crankpin 11 from position 16 to position 17 to cause a substantial movement in the crankpin 32 from the position 40 to position 41, and at the same time and with the same mechanism the motion caused by the movement of the crankpin 11 from point 18 to point 19 will produce only a very slight movement of the crankpin 32 and this movement can readily be made practically as small as desirable. If for example, the movement of the crankpin 32 from the position shown to position 41 produces a movement of 6/10 of an inch, the trifling movement of crankpin 32 corresponding to the movement of crankpin 11 from point 18 to point 19 need not be over $\tfrac{1}{64}$ or $\tfrac{1}{32}$ of an inch. In other words, it is possible by this mechanism to obtain the necessary movement to open the valve a substantial amount and close it while the pin 11 is travelling through an arc of 145° and yet while the pin is travelling through the balance of the arc—215°—the movement of the arm 33 will be almost suppressed, the movement being just sufficient to enable the arm 35 to pull slightly out of contact with the head 36 of the valve stem and thus surrender it to the action of the spring. At the same time the clearance or play between the arm end 35 and the walls of the valve stem head 36 can be kept so small that the hammering and click resulting therefrom will be reduced to the desired minimum.

It will be observed that the crankpin 30 is set at the dead center of the bell crank 25, that is, in its extreme movement as shown it reaches the dead center position. By starting the crankpin 30 at the dead center position, or even beyond the dead center position, the idle throw movement tending to move the bell crank 33 can be made extremely small and therefore the clearance between the arm 35 and the valve stem head 36 can be made as small as desirable. If in any case there is no objection to a considerable idle movement or clearance, the connecting rod 27 can be directly connected to the crankpin 32, thus eliminating the bell crank 25 and connecting rod 31 and simplifying the apparatus.

It will be noted that if the pin or position 26 is in line with the position 13 and with the center of the pivot 15, and if the position 20 is as far below the position 13 as the position 21 is above it, then when the crankpin 13 is in the position 20, the pin 26 will be pulled back to the position 28, the same position it occupies when the pin 13 is at position 21. In other words, when the pin 11 is at the position 19 the arm 35 will be brought down to exactly the position it occupied when on its upward movement it was leaving contact with the valve stem head 36, that is to say, on the dip or false movement of the arm 35 it will come down exactly in contact with the head 36.

If, on the other hand, the distance from the position 13 to position 20 be made less than the distance from 13 to 21, then the pin 26, when the crankpin reaches position 19, will not be pulled back to the position 28 but will be pulled back to some intermediate position. In the drawing I have shown the position 20 to be enough nearer the position 13 so that the pin 26 is pulled back to the position 28a (instead of 28) when the pin 11 is at the point 19, that is, at the bottom of its revolution. This will result in pin 30 being pulled back to point 38a and this will result in a comparatively small downward movement or dip of the arm 35, for example, as indicated by the dotted line 45 in Fig. 2. In other words, on the dip or false movement the arm 35 would not come down far enough to touch the head 36. It is preferable that the dip should not be a very large proportion of the upward movement of the arm 35 because in practice, the parts cannot be kept in accurate adjustment and therefore it is desirable that there should be no danger of part 35 coming in contact with part 36 on the dip movement. It will be evident that by varying the relative positions of point 20 and 21 with reference to position 13, the amount of drawback or dip of the arm 35 can be made as much or as little as desirable within certain limits.

This general arrangement has two important advantages. One is that while motion of the valve in covering the major part of its movement up or down can be made very rapid, the rate of movement or the velocity of the valve as it reaches its seat is reduced to a low figure. In other words, the valve is brought to its seat gently and the shock of too rapid contact is avoided. The other advantage is that after the valve once starts to open its motion is very rapid so that it opens quite as rapidly as any valve movement that can be produced by any cam action adapted for high speed operation.

In this arrangement the spring may be used to simply hold the valve on its seat after it is released from the arm 35, or it may be used to actually move or force the valve back to its seat, in which case the underside of 36 would remain in contact with 35 until the valve is seated. In other words the spring would perform the function of overcoming the inertia of the valve and its stem only and would not have to overcome the inertia of the valve actuating mechanism, which inertia is very much greater than the inertia of the valve itself. In this way it becomes practicable to use moderate size springs and thereby avoid the danger of their breaking. If the speed of operation is so high that springs cannot perform the function of overcoming the inertia of the valves then the upper part of the head 36 can be relied upon to pull the valve closed by contact with the arm 35. Indeed it would be possible to eliminate the spring entirely if the gas pressure within the cylinder is sufficient to hold the valve closed. It will be observed that by the mechanism hereinbefore described the valve can be brought back to its seat, as well as lifted up from its seat, by the positive action of the connecting rods and arms with no cam action of any kind being involved, and that the working parts consist entirely of pin joints which can readily be made with the required accuracy and which are quite inexpensive. However, as above stated the pressure of a spring can be used to close the valve, if the speed is not excessive, in which case the underside of arm 35 would remain in contact with the valve stem head 36 during the closing period.

With the proper lubrication they will also last for a very much longer period than any kind of valve mechanism now in use.

It will be observed that this mechanism is very strong and by making the pins and bearings large enough, one such piece of mechanism as that shown can be made strong enough to operate two valves or four valves, even where the valves are of large size. This is important, particularly in high speed engines, because the force required to operate valves of considerable size is very great. Even in small four-cycle engines with valves of something like 3½" in diameter and with a camshaft turning at 400 revolutions per minute the spring required to close the valves quickly enough with ordinary cam action is over 300 pounds. Since in my arrangement no spring is needed to close the valves, therefore in opening the valves, there is only the inertia of the valves and other moving parts and the initial gas pressure, to overcome. Less force is needed to close the valves, since there is no initial gas pressure to be overcome.

My apparatus will also be remarkably free from wear. The valve gear may also be applied to poppet-valves of steam engines or to piston or other types of valves driven by crank motion, where it is desirable to obtain a large valve movement for opening or closing the ports with a comparatively small idle movement corresponding with the rest of the arc of revolution.

My invention is equally applicable to the operation of poppet valves of four-cycle diesel or gasoline engines, the only difference in such a case being that the camshaft runs at half engine speed and the valve or valves will remain open through a somewhat shorter arc of camshaft revolution say 120° instead of 145°. This will result in a somewhat increased idle movement compared with the valve lifting movement, but with my mechanism the necessary conditions to secure quiet and satisfactory running can readily be obtained.

In the case of supercharged high speed four-cycle engines, the arc of movement may be greater and may more nearly approach 145°. The different connecting rods may of course be placed at different angles with reference to each other, and these and other parts may be made of varying proportions depending upon the conditions. Similarly, instead of the triangle or bell crank 33, the movement of crank-pin 32 may be transmitted to the valve stem 44 in other ways than that shown.

If the bell crank 25 be set considerably higher up with reference to the pin 32 and pivot 15, the bell crank 25 may be formed with a single arm and the pin 26 may be combined with the pin 30.

While I have shown and described a crankshaft 10 for actuating the connecting rod 12 and connected parts, equivalent means, such as an eccentric, may be used, and in the claims, the term "crank-shaft" is to be understood as including an eccentric as an equivalent.

Moreover, where reference numerals have been used in the claims, this has been done for lucidity, and not as excluding equivalents.

This application is a continuation in part, of my application, Serial No. 20,584, filed May 9, 1935.

What is claimed is:

1. In combination, a poppet valve, a crank, and intervening mechanism comprising an oscillating part, a rod connecting said oscillating part and crank, and a second rod connected to said oscillating member, said intervening mechanism being arranged and adapted to convert rotary motion of the crank-shaft into a reciprocating motion having a slight movement throughout the period corresponding to the closed position of the valve, and a wide movement during the period corresponding to the open position of the valve, said mechanism being operatively connected to the valve in such manner as to free the valve from the constraint of the operating mechanism as the valve becomes seated and during the time the valve is to remain closed.

2. Poppet valve operating mechanism, comprising a crank, a member rocking on a fixed pivot and having one or more arms, a rod connecting the crank with an arm of said rocking member, mechanism for transmitting motion to the poppet-valve, and a rod connecting an arm of said rocking member with said transmitting mechanism, the parts being arranged and cooperating in such manner that said last-named rod and said rocking member move near the dead-center position so as to impart only a slight movement to said transmitting mechanism while the valve remains closed, and move away from the dead-center position so as to impart considerable movement to said transmitting mechanism for opening the valve, and said mechanism being operatively connected to the valve in such manner as to free the valve from the constraint of the operating mechanism as the valve becomes seated and during the time the valve is to remain closed.

3. Poppet valve operating mechanism according to claim 1, further comprising a spring tending to close the valve.

4. Poppet valve operating mechanism, comprising a crank, a member rocking on a fixed pivot and having one or more arms, a rod connecting the crank with an arm of said rocking member, mechanism for transmitting motion to the poppet valve, a rod connecting an arm of said rocking member with said transmitting mechanism, the parts being arranged and cooperating in such manner that said last-named rod and said rocking member move near the dead-center position so as to impart only a slight movement to said transmitting mechanism while the valve remains closed, and move away from the dead-center position so as to impart considerable movement to said transmitting mechanism for opening the valve, and means for connecting said transmitting mechanism to the valve so that the valve is thereby moved to and from closing position, a clearance or lost motion being provided in the operating mechanism whereby the valve as it becomes seated is released from the control of the operating mechanism and remains released until the period of valve-opening recurs.

5. Poppet valve operating mechanism, comprising a crank, a rocking member having one or more arms, a rod connecting said crank and an arm on said rocking member, mechanism for transmitting motion to the poppet valve, and a rod connecting an arm of said rocking member with said transmitting mechanism, the parts being arranged and cooperating in such manner that said last named rod and said rocking member move near the dead center position so as to impart only a slight movement to said transmitting mechanism while the valve remains closed, and move away from the dead center position so as to impart considerable movement to said transmitting mechanism for opening the valve, said transmitting mechanism having therein means for reducing the movement imparted thereto by said rod during the movement of the latter near its dead center position.

6. Valve operating mechanism according to claim 5, wherein a clearance or lost motion is provided in the operating mechanism whereby the valve as it becomes seated is released from the control of the operating mechanism and remains released until the period of valve opening recurs.

7. Valve operating mechanism according to claim 5, further comprising a spring tending to close the valve.

8. The combination in poppet valve operating mechanism, of an actuating crank shaft (10), a connecting rod (12), a member (14) oscillated by the crank-driven connecting rod, a second connecting rod (27), and a valve operating part (33) connected so as to receive oscillatory movement from said second connecting-rod, said crank-shaft, oscillating member, valve operating part, and connecting rods being so arranged and correlated that a slight movement is imparted to said valve operating part (33) throughout the period corresponding to the closed position of the valve, and a wide movement is imparted thereto during the period corresponding to the open position of the valve, said mechanism being operatively connected to the valve in such manner as to free the valve from the constraint of the operating mechanism as the valve becomes seated and during the time the valve is to remain closed.

9. Poppet valve operating mechanism, comprising a crank, a rocking member having one or more arms, a rod connecting said crank and an arm on said rocking part, a second rocking member having one or more arms, a rod connecting one of its arms with an arm of the other rocking member, means for transmitting motion to a valve and a rod connecting an arm of said second rocking member to the transmitting means, the parts being arranged and co-operating in such manner that the connecting rods and arms are moved simultaneously in the neighborhood of their dead center position during the period corresponding to the closed position of the valve and are moved away from the neighborhood of said dead center position during the period corresponding to the open position of the valve, whereby a substantial movement is obtained for opening and closing the valve and a greatly reduced movement during the time the valve is closed.

10. Valve operating mechanism comprising a crank (10), a rocking member (14) oscillated by said crank and having one or more arms, a rod (27), connected to an arm of said rocking member (14) and means for transmitting the motion of the connecting rod (27) to a valve, the correlation and arrangement of said parts being such that the connecting rod and arm operate near the dead center while the valve remains closed and away from the dead center when the valve opens, the movement away from the dead-center position of said rod (27) and the arm to which it is connected, imparted thereto by said crank at the bottom of its throw (positions 19, 20, 28a), being less than the movement of said rod (27) and arm at the opposite side of the dead center position thereof at the positions of said crank (10) at which the mechanism operates to open and close the valve (positions 16, 21, 28—18, 21, 28).

CHARLES G. CURTIS.